Nov. 7, 1961   F. W. GARVER   3,007,231
METHOD OF PRODUCING METAL ROLLERS
Filed Jan. 18, 1960   2 Sheets-Sheet 1
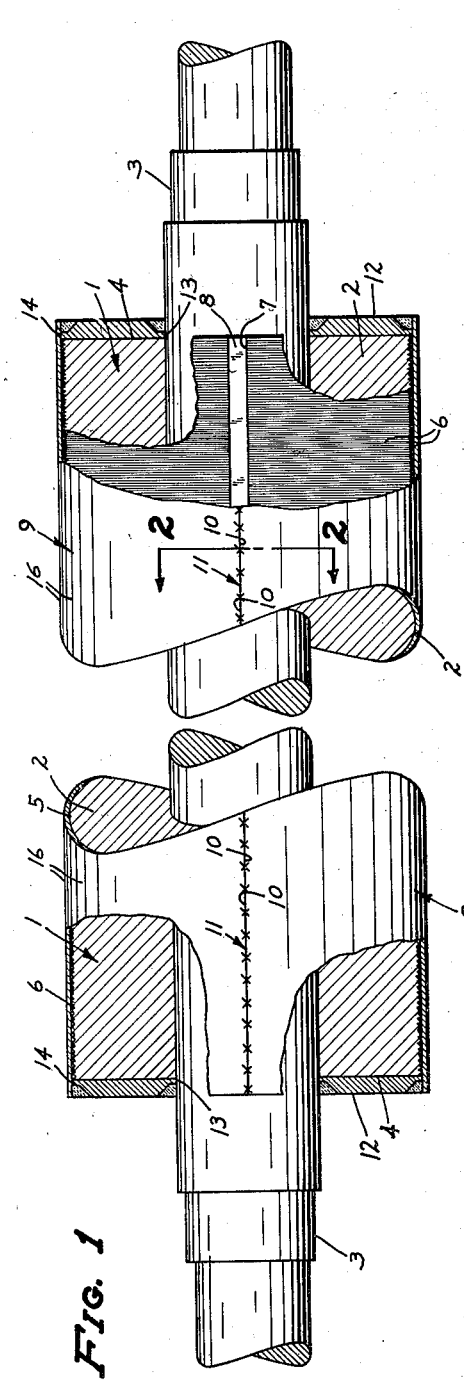
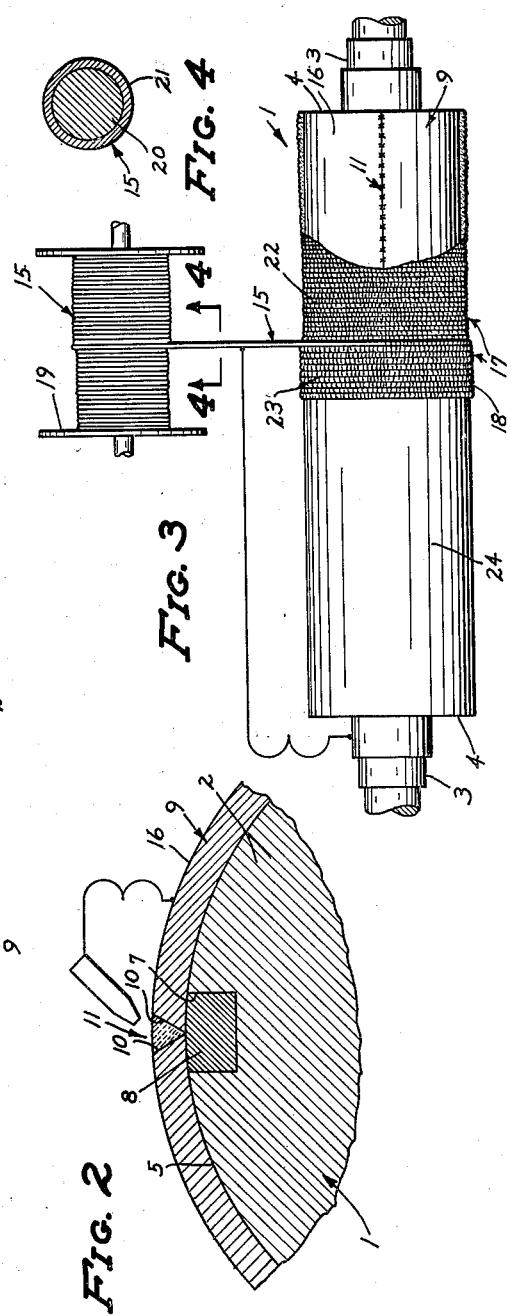
INVENTOR.
FREDERICK W. GARVER
BY
Merchant & Merchant
ATTORNEYS INVENTOR.
FREDERICK W. GARVER
BY
Merchant & Merchant
ATTORNEYS United States Patent Office 3,007,231
Patented Nov. 7, 1961

3,007,231
METHOD OF PRODUCING METAL ROLLERS
Frederick W. Garver, Minneapolis, Minn., assignor to Alloy Hardfacing Co., Minneapolis, Minn., a corporation of Minnesota
Filed Jan. 18, 1960, Ser. No. 2,942
6 Claims. (Cl. 29—148.4)

This invention relates to rollers such as utilized in rolling mills, and more particularly to a new and useful method of producing metal rollers.

This invention comprehends the production of metal rollers by covering a cast iron core with a build-up layer of metal, then continuously fusing an elongated metallic rod thereover in a helical arrangement and thereafter machining the surface of the fused metal to a desired finish. This invention also appertains to the reconditioning of damaged or worn rollers in which it has generally been the practice to either throw away the entire roll or attempt to resurface it by applying a new sleeve to the roll or by welding a new surface thereto. However, with rollers made of cast iron, previously known methods of reconditioning the same have been unsatisfactory due to difficulty in fusing new surfaces on the old rollers. A specific problem has been the difficulty in satisfactorily welding a new layer of metal to the old cast iron roller, and avoiding the tendency of the weld to separate from the roller within a short period after the reparation. In this respect, another important object of this invention is the provision of a method of reconditioning a damaged or worn roller which avoids the above stated previously perplexing problems.

Another object of my invention is the provision of a method of producing a metal roller with a working surface thereon that will not separate from the roller core or otherwise become defective other than by exposure to a period of extended and normal use.

A further object of my invention is the provision of a method of reconditioning a damaged or worn roller of cast iron or the like, which produces a roller that will have a new life greater than the life of the original roller due to the fact that the working surface built up thereon may be formed from recently developed alloys that will give a higher quality and more desirable working surface than the surface of the old roller. Since the cost of these alloys would prohibit the production of a roller made completely therefrom, and since previous methods of reconditioning old rollers have been generally unsatisfactory, the above stated object will readily be seen to be easily substantiated and readily recognized.

Further objects of my invention reside in the provision of a method of producing a metal roller which may be practiced at a minimum of expense and which results in a roller of improved quality, uniform hardness, and having an extremely smooth long wearing surface.

The above and still further objects of my invention will become apparent from the following detailed specification, appended claims and attached drawings.

Referring to the drawings wherein like reference characters indicate like parts or elements throughout the several views:

FIG. 1 is a plan view of a roller that has been subjected to a portion of the steps of my method, some parts broken away and some parts shown in section;

FIG. 2 is a transverse sectional view taken on the line 2—2 of FIG. 1, partly in diagrammatic;

FIG. 3 is a diagrammatic view of a succeeding step in my invention;

FIG. 4 is an enlarged view in transverse section taken on the line 4—4 of FIG. 3;

Figure 5:
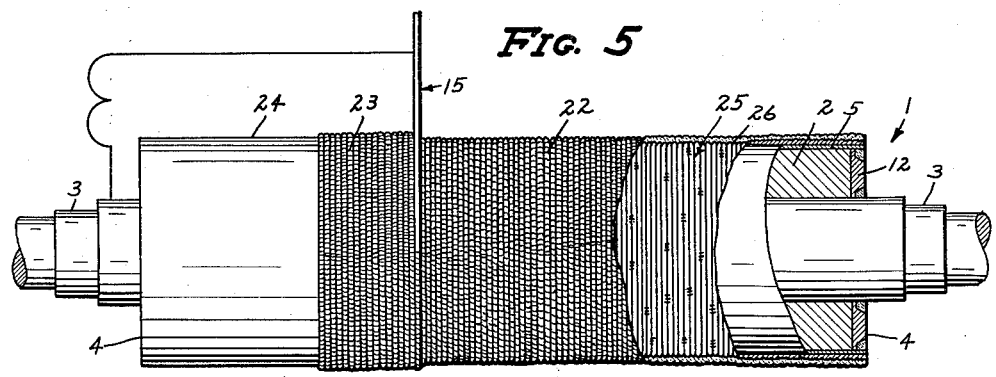
FIG. 5 is a view corresponding to FIG. 3 but showing an alternative embodiment of my invention.

Referring with greater particularity to the drawings, the reference numeral 1 represents generally a cylindrical metallic roller. One use of such type of roller is in the manufacture of dried flake cereals, and its core 2 is generally made from a high carbon iron such as cast iron. The roller 1, has journals 3 on opposite ends 4 thereof, which are usually made from low carbon steel or the like.

The first step of the preferred embodiment of my novel method consists of machining the cylindrical surface 5 of the core 2 of the roller 1 to a given diameter. The machining operation produces thread-like corrugations, as at 6, on the surface 5 of said roller 1. However, if desired, a separate machining operation may be used on the surface 5 to produce the corrugations 6, or a given degree of roughness thereon. After the roller 1 is machined to the desired diameter, a longitudinal groove 7 is machined in the roller 1, and an elongated low carbon steel insert 8 is fitted snugly into the groove 7. The insert 8 is cross-sectionally generally identical to the groove 7. After fitting the insert 8 into the groove 7, a cylindrical steel sleeve 9 of low carbon content, such as mild steel, is fitted snugly around said roller 1. The sleeve 9 is preferably formed from a single piece of sheet steel and therefore has a pair of opposingly facing edges 10, which when welded together form a longitudinal seam, indicated generally by the numeral 11. The edges 10 of the sleeve 9 are placed directly over the insert 8, and welded thereto. The insert 8 is needed to produce a tight connection between the sleeve 9 and the roller 1, since the low carbon steel sleeve 9 cannot be satisfactorily welded to the high carbon iron or steel roller 1 without the danger of almost certain later separation between the two. The welding of the sleeve 9 to said insert 8, coupled with the corrugated surface 6 of the roller 1, together produce an extremely tight fit between the sleeve 9 and the roller 1.

Preferably, and as shown, a pair of annular low carbon steel end plates 12 engage opposite ends 4 of the roller 1. Each of the end plates 12 defines a circular aperture 13 centrally located therein. The apertures 13 receive the journals 3 of the roller 1. The end plates 12 are welded at their outer peripheral edges 14 to the sleeve 9, and are also welded at the apertures 13 to the low carbon steel journals 3 of the roller 1.

Then an elongated alloy steel rod 15 is continuously welded to the outer cylindrical surface 16 of the sleeve 9 in a closely coiled helical arrangement, said welding causing a coalescent blend of portions of the sleeve 9 with the rod 15. A sufficient number of concentric layers 17 of the coiled rod 15 are used to build up the desired roller diameter. The rod 15 is formed from an alloy steel that will provide a hard working surface 18 and that may also be welded to the low-carbon steel sleeve 9. Preferably, and as shown particularly in FIG. 3, the rod 15 is wound from a coil 19 and welded directly to the sleeve 9 as it is wound thereon. The rod 15 preferably is formed with a center alloy portion 20 and having a tubular coating 21 thereon of low carbon steel. An extremely satisfactory working surface 18 may be produced by using one or more build-up layers 22 in which the alloy center portion 20 of the rod 15 comprises a manganese, silicon, molybdenum and carbon steel combination, and a finish layer 23 in which the alloy center portion 20 of the rod 15 comprises a chromium, tungsten, molybdenum, manganese and carbon steel combination. The cooling of the welded build-up layers 22 and the finish layer 23 of the rod 15 causes the same to shrink against the sleeve 9 whereupon the sleeve 9 is made to fit extreemly tight against the core 2 of the roller 1.

After applying the layers 22, 23 of the rod 14, the outer cylindrical surface 24 thereof is machined to form the desired finish. After completing this operation, a roller is produced that will wear for a period of time far exceeding the normal life of a conventional cast iron roller.

It should be obvious that the method outlined above also possesses an extreme amount of utility with reference to the reconditioning of damaged or worn rollers. In this regard the same steps and procedure are followed except that a worn roller core is used instead of the new core 2 referred to above.

FIG. 5 shows an alternative embodiment of my invention in which a layer of low carbon steel rod 25 is wound on the roller 1 in a coiled helical arangement in place of the sleeve 9. Then the coiled rod 25, after being wound on the core 2, is tack welded at random points about its outer surface 26 and to the end plates 12. Then the remaining steps are performed as outlined above, e.g., the build-up layers 22 and a finish layer 23 are added, and the outer surface 26 is machined to the desired finish.

Figure 6:
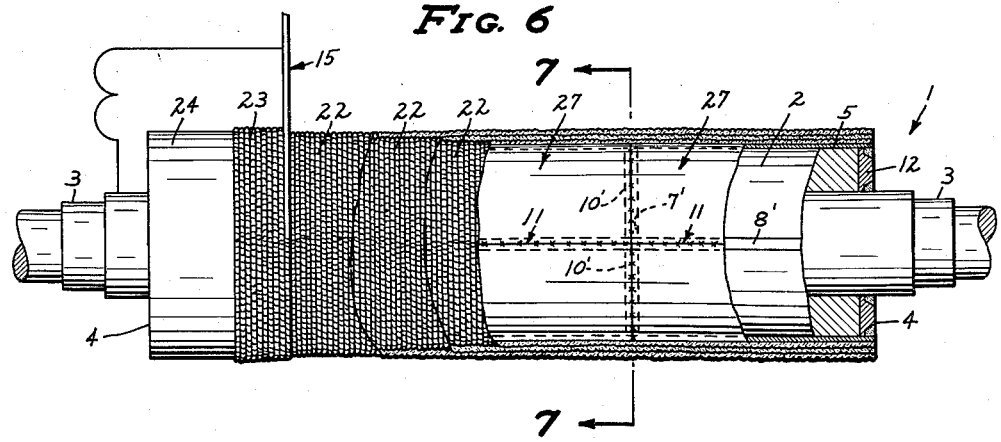
FIG. 6 is a view corresponding to FIG. 3 but showing another embodiment of my invention.
Figure 7:
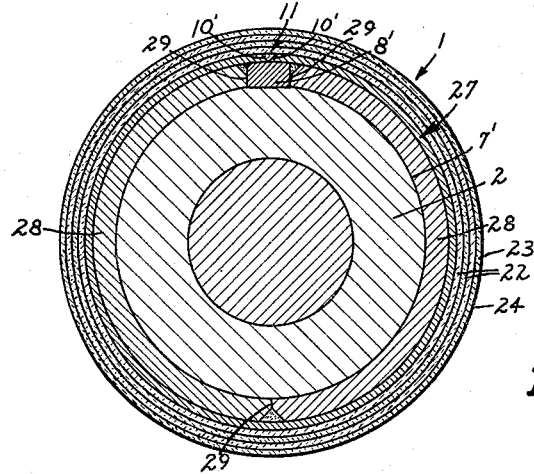
FIG. 7 is a transverse sectional view taken on the line 7—7 of FIG. 6.

FIGS. 6 and 7 show another embodiment of my invention in which a plurality of axially aligned low carbon steel split sleeves 27 are applied to the core 2 of the roller 1 in lieu of the sleeve 9. With this embodiment, circumferential grooves 7' are machined in the core 2 of the roller 1 in corresponding axially spaced relationship with respect to the opposingly facing circumferential edges 10' of the split sleeves 27. Then a plurality of semicircular low carbon steel inserts 28 are fitted in pairs, as shown in FIG. 7, into the grooves 7'. The joints 29 of the abutting inserts 28 are then tack welded, and the split sleeves 27 thereafter welded at both their longitudinal and circumferential edges to the inserts 8', 28 and to the end plates 12. Then the remaining steps of my invention are performed as outlined above, e.g., addition of the build-up layers 22 and a finish layer 23, and machining of the outer surface 24 to the desired finish.

This invention has been thoroughly tested and found to be completely satisfactory for the accomplishment of the above objects; and while I have shown a preferred embodiment thereof, I wish it to be specifically understood that same may be modified without departure from the scope and spirit of the appended claims.

What I claim is:

1. The method of producing a cylindrical metallic roller, said method comprising, machining the cylindrical surface of the roller to a given diameter, fitting a metal build-up layer into snugly encompassing relation with the machined surface of said roller, continuously fusing an elongated metallic rod to the outer cylindrical surface of said build-up layer in a closely coiled helical arrangemnet so as to cause a coalescent blend of portions of said build-up layer and said rod and in a sufficient number of concentric layers to build up the desired roller diameter, and thereafter machining the outer cylindrical surface of the fused metal to a desired finish.

2. The method of producing a cylindrical metallic roller of the type requiring an outer working surface formed from a metal which cannot be suitably fused directly to said roller, said method comprising, machining the cylindrical surface of the roller to a given diameter and thereby imparting a given degree of roughness thereto, fitting a cylindrical metal sleeve into snugly encompassing relation with the machined surface of said roller, said sleeve being formed from a metal which may be suitably fused to the metal forming the desired working surface, continuously fusing an elongated metallic rod to the outer cylindrical surface of said sleeve in a closely coiled helical arrangement so as to cause a coalescent blend of portions of said sleeve and said rod and in a sufficient number of concentric layers to build up the desired roller diameter, said rod comprising the metal forming the desired working surface, and thereafter machining the outer cylindrical surface of the fused metal to a desired finish.

3. The method of producing a cylindrical metallic roller of the type requiring an outer working surface formed from a metal which cannot be suitably fused directly to said roller, said method comprising, machining the cylindrical surface of the roller to a given diameter and thereby imparting a given degree of roughness thereto, machining a groove in said roller longitudinally thereof, fitting an elongated insert into the groove of said roller, said insert being cross-sectionally generally identical to the groove and also being formed from a metal which may be suitably fused to a metal fusible to the metal forming the desired working surface, fitting a cylindrical metal sleeve into snugly encompassing relation with the machined surface of said roller, said sleeve having a longitudinal seam the edges of which are welded together and to said insert, said sleeve being formed from a metal which may be suitably fused to the metal forming the desired working surface, continuously welding an elongated metallic rod to the outer cylindrical surface of said sleeve in a closely coiled helical arrangement so as to cause a coalescent blend of portions of said sleeve and said rod and in a sufficient number of concentric layers to build up the desired roller diameter, said rod comprising the metal forming the desired working surface, and thereafter machining the outer cylindrical surface of the welded metal to a desired finish.

4. The method of producing a cylindrical metallic roller of the type which, being made from high carbon steel or iron, requires an outer working surface formed from a metal which cannot be suitably welded directly to said roller, said method comprising, machining the cylindrical surface of the roller to a given diameter and thereby imparting a given degree of roughness thereto, machining a groove in said roller longitudinally thereof, fitting an elongated lower carbon steel insert into the groove of said roller, said insert being cross-sectionally generally identical to the groove, fitting a cylindrical low carbon steel sleeve into snugly encompassing relation with the machined surface of said roller, said sleeve having a longitudinal seam the edges of which are welded together and to said insert, continuously welding an elongated alloy steel rod to the outer cylindrical surface of said sleeve in a closely coiled helical arrangement so as to cause a coalescent blend of adjacent portions of said sleeve and said rod and in a sufficient number of concentric layers to build up the desired roller diameter, said rod being formed from an alloy steel that provides a hard working surface and that may also be welded to said low carbon steel sleeve, and thereafter machining the outer cylindrical surface of the welded metal to a desired finish.

5. The method of producing a cylindrical metallic roller of the type requiring an outer working surface formed from a metal which cannot be suitably fused directly to said roller, said method comprising, machining the cylindrical surface of the roller to a given diameter and thereby imparting a given degree of roughness thereto, continuously winding an elongated first metallic rod to the outer cylindrical surface of said roller in a closely coiled helical arrangement, said rod being formed from a metal which may be suitably fused to the metal forming the desired working surface, continuously fusing an elongated metallic second rod to the outer cylindrical surface of said first rod in a closely coiled helical arrangement so as to cause a coalescent blend of adjacent portions of said first rod and said second rod and in a sufficient number of concentric layers to build up the desired roller diameter, said rod comprising the metal forming the desired working surface, and thereafter machining the outer cylindrical surface of the fused metal to a desired finish.

6. The method of producing a cylindrical metallic roller of the type requiring an outer working surface formed from a metal which cannot be suitably fused directly to said roller, said method comprising, machining the cylindrical surface of the roller to a given diameter and thereby imparting a given degree of roughness thereto, fitting a plurality of axially spaced segment-cylindrical metal shells into snugly encompassing relation with the machined surface of said roller, said shells being formed from a metal which may be suitably fused to the metal forming the desired working surface, continuously fusing an elongated metallic rod to the outer cylindrical surface of said shells in a closely coiled helical arrangement so as to cause a coalescent blend of portions of said shells and said rod and in a sufficient number of concentric layers to build up the desired roller diameter, said rod comprising the metal forming the desired working surface, and thereafter machining the outer cylindrical surface of the fused metal to a desired finish.

References Cited in the file of this patent

UNITED STATES PATENTS

| | | |
|---|---|---|
| 1,884,104 | Moore | Oct. 25, 1932 |
| 2,219,085 | Watson | Oct. 22, 1940 |

FOREIGN PATENTS

| | | |
|---|---|---|
| 109,334 | Australia | Dec. 21, 1939 |